United States Patent
Takamura

(10) Patent No.: US 8,912,261 B2
(45) Date of Patent: Dec. 16, 2014

(54) PROCESS FOR MAKING PARTICULATE-FREE POLY(PHENYLENE ETHER) COMPOSITIONS AND PHOTOVOLTAIC BACKSHEET MATERIALS DERIVED THEREFROM

(75) Inventor: Norihiro Takamura, Tochigi (JP)

(73) Assignee: SABIC Global Technologies B.V., Pittsfield, MA (US)

( * ) Notice: Subject to any disclaimer, the term of this patent is extended or adjusted under 35 U.S.C. 154(b) by 0 days.

(21) Appl. No.: 13/530,750

(22) Filed: Jun. 22, 2012

(65) Prior Publication Data

US 2013/0345345 A1 Dec. 26, 2013

(51) Int. Cl.
*C08K 5/523* (2006.01)

(52) U.S. Cl.
USPC .......................... 524/127; 524/140; 524/141

(58) Field of Classification Search
USPC .......................................... 524/127, 140, 141
See application file for complete search history.

(56) References Cited

U.S. PATENT DOCUMENTS

| 2005/0046070 A1* | 3/2005 | Dong et al. .................. 264/141 |
| 2005/0049362 A1* | 3/2005 | Buckley et al. ............... 525/132 |
| 2005/0064129 A1* | 3/2005 | Dong et al. .................. 428/64.2 |
| 2005/0250932 A1* | 11/2005 | Hossan et al. ................ 528/480 |
| 2006/0135695 A1* | 6/2006 | Guo et al. .................... 525/92 D |
| 2007/0261877 A1* | 11/2007 | Mhetar et al. ................ 174/110 R |
| 2008/0193755 A1* | 8/2008 | Guise et al. .................. 428/379 |
| 2011/0079427 A1* | 4/2011 | Powale et al. ............... 174/72 A |

FOREIGN PATENT DOCUMENTS

| JP | 2010245380 | 10/2010 |
| JP | 2010-254994 | 11/2010 |
| WO | 2005021648 | 3/2005 |
| WO | 2005021650 | 3/2005 |
| WO | 2008103556 | 8/2008 |

OTHER PUBLICATIONS

National Printing Bureau of Japan, "Dirt Estimation Chart", www.choyokai.co.jp/chart/ (last visited Apr. 7, 2014).

* cited by examiner

*Primary Examiner* — Peter Szekely
(74) *Attorney, Agent, or Firm* — Honigman Miller Schwartz and Cohn LLP; Heidi M. Berven

(57) ABSTRACT

The present invention is directed to a process for preparing halogen-free melt-filtered polymer compositions, compositions prepared by the process, as well as articles derived therefrom. The process comprises filtering the melted composition through a filter to remove particulate impurities that are 0.5 mm$^2$ in size or larger. The composition comprises:
  (a) 60 to 90 percent by weight of a poly(phenylene ether);
  (b) 3 to 23 percent by weight of a styrenic polymer;
  (c) 5-11 percent by weight of a halogen-free flame retardant comprising at least one organic phosphate flame retardant, wherein the composition has:
    (i) a melt viscosity of 620 Pa·s or less as measured according at 280° C. and 1500 s$^{-1}$; and
    (ii) a heat deflection temperature that is 135° C. or more as measured according to ASTM D648 on 6.4 mm thick bars at 1.82 MPa.

22 Claims, No Drawings

PROCESS FOR MAKING PARTICULATE-FREE POLY(PHENYLENE ETHER) COMPOSITIONS AND PHOTOVOLTAIC BACKSHEET MATERIALS DERIVED THEREFROM

BACKGROUND

Solar panels convert light to electricity. They are designed to maximize electrical output for each photovoltaic module in a solar panel array and to minimize degradation of the module due to environmental exposure—for instance, from moisture, UV radiation, or oxygen. For that reason, the photovoltaic modules are enclosed within a number of exterior material layers that serve various purposes. Thus, the photovoltaic modules are encapsulated in a protective shell, or encapsulant, of a polymeric material such as ethylene vinyl acetate or another thermoplastic material. The encapsulated photovoltaic modules are then sandwiched between a frontsheet and a backsheet. The frontsheet is designed to allow light to reach the photovoltaic modules. The backsheet is designed to insulate the photovoltaic modules as well as to protect them from mechanical perturbations and environmental exposure.

Generally, the backsheet is constructed from a number of film layers that are laminated together in a thermoforming process. The films used to form the backsheet must meet a number of requirements. Firstly, they should be free of surface defects such as surface pits and particulate residues (or grits) to ensure good layer-to-layer adherence. Secondly, the films should not shrink or wrinkle during the lamination process. Thirdly, the films should be prepared from materials in accordance with various environmental considerations, such as the Waste in Electrical and Electronic Equipment Directive (WEEE) and the Restriction of Hazardous Substances Directive (ROHS). For instance, the films should be halogen-free.

One approach to making films meeting these requirements is suggested by U.S. Pat. No. 7,244,813 titled "Methods of Purifying Polymeric Material." The material comprises poly(arylene ethers) and poly(alkeny aromatics) designed for use in data storage media applications (e.g., compact disks, blue ray disks and the like). A requirement for such materials is that they contain limited quantities of particulate impurities. Particulate impurities include impurities include gels and carbonized polymeric materials that result during material manufacture. Poly(arylene ether)s and compositions derived therefrom are known to oxidize and form gels if maintained at high temperatures. These resins may also form carbonized "black specks" or degrade in color (darken) if processed at high temperatures for extended periods of time. Even the smallest of these black specks (i.e., specks that are invisible to the human eye) will impede the mechanical performance of films derived from such compositions. Such impurities can be removed by the process of melt-filtration. The exacting performance standards required for materials are met by a melt filtration process disclosed in U.S. Pat. No. 7,244,813, which produces materials that are substantially free of specks that are large enough to be visible to the human eye, as well as specks that are even smaller.

However, the melt filtration process disclosed in U.S. Pat. No. 7,244,813 does not translate well for the preparation of poly(phenylene ether) materials where high processing throughput is a desired goal and the performance standards are not as exacting as for data storage media applications, such as in the preparation of materials used to make photovoltaic backsheet films. One issue is that, because of the extremely small particles that need to be removed, run processing times for the extrusion in U.S. Pat. No. 7,244,813 are short due to performance failures, including the filter plugging, high back pressures, and the like.

As a result, there continues to be a need for processes to make materials destined for use as backsheet films. In particular, there is a need for processes for making halogen-free films that are designed for use in photovoltaic backsheets that have good adherence properties, are free of visible specks or defects, and that can withstand lamination processing conditions.

SUMMARY

These and other needs are met by the present invention, which is directed to a process for preparing a halogen-free melt-filtered polymer composition, comprising: filtering the melted composition through a filter to remove particulate impurities that are 0.5 mm$^2$ in size or larger from a film fabricated with the composition which is produced in the process, wherein the composition comprises: wherein the composition comprises:

(a) 60 to 90 percent by weight of a poly(phenylene ether);
(b) 3 to 23 percent by weight of a styrenic polymer;
(c) 5-11 percent by weight of a halogen-free flame retardant comprising at least one organic phosphate flame retardant, wherein the composition has:
   (i) a melt viscosity of 620 Pa·s or less as measured according at 280° C. and 1500 s$^{-1}$; and
   (ii) a heat deflection temperature that is 135° C. or more as measured according to ASTM D648 on 6.4 mm thick bars at 1.82 MPa.

What is also provided is a composition prepared by the process described herein as well as articles, such as films for use as backsheets, derived therefrom.

The process of the present invention is capable of making industrial quantities of material. Run processing times for making the material are long. Run processing time is defined as the time recorded until the extrusion is discontinued due to performance failures, including the filter plugging, high back pressures, and the like. The target run processing time is 10 or more hours. In addition, throughput in making the material is at least 20 kg/hr and can exceed 260 kg/hr. Moreover, the process is capable of removing visible specks 0.5 mm$^2$ or greater in size from films that are made from the material, so that the material can be used to make backsheet films for photovoltaic cells.

DETAILED DESCRIPTION

All ranges disclosed herein are inclusive of the endpoints, and the endpoints can be independently combined with each other unless otherwise indicated. The use of the terms "a" and "an" and "the" and similar referents in the context of describing the invention (especially in the context of claims) are to be construed to cover both their singular and plural meanings, unless otherwise indicated herein or clearly contradicted by context. It should further be noted that the terms "first," "second," and the like herein do not denote any order, quantity, or importance, but rather are used to distinguish one element from another. The modifier "about" used in connection with a quantity is inclusive of the stated value and has the meaning dictated by the context (that is, it includes the degree of error associated with measurement of the particular quantity). As used herein, weight percent is based on a 100 weight percent composition.

Melt Filtration

Poly(arylene ether)s and compositions derived therefrom are known to oxidize and form gels if maintained at high temperatures. These resins may also form carbonized "black specks" or degrade in color (darken) if processed at high temperatures for extended periods of time. Such impurities can be removed by the process of melt-filtration, as described in U.S. Pat. No. 7,244,813. Thus, for the purposes of this disclosure, melt-filtering means the process of filtering the melted composition to remove particulate impurities as it is prepared via extrusion. The term "melted" as used in the phrase "melted mixture" or "melted composition" means that the mixture or composition is in a liquid, flowable state as a result of being heated as is typical during the extrusion process. The phrase "free of particulate impurities that are 0.5 $mm^2$ in size or larger:" means that such particulates, which are "black specks" as described above, are not visible to the naked eye.

Any type of extruder that is capable of providing a homogenous melt of poly(phenylene ether), poly(alkenyl aromatic) and/or additional resins and additives, may be used. Useful types of extruders include, for example, a twin screw counter-rotating extruder, a twin screw co-rotating extruder, a single screw extruder, a single screw reciprocating extenders, a kneader, a ring extruder, a combination of the foregoing, and the like.

A single extruder or multiple extruders may be employed. In one embodiment, a single screw extruder is used. However, it is generally preferable to use multi-screw extruders due to their greater pumping capability through the melt filtration system.

Twin-screw counter-rotating extruders, such as those manufactured by Leistritz Extrusionstechnik and NFM Welding-Engineers, are useful and are often preferred where higher pressures or longer residence times are desired. Conical counter-rotating twin-screw extruders, such as those manufactured by Milacron, are also preferred due to large feed capabilities and high pumping efficiencies. Twin-screw co-rotating, intermeshing extruders, such as those manufactured by Coperion Werner-Pfleiderer, are especially preferred due to their high through-put rates, short residence times, flexible screw designs, outstanding alloying, and other design benefits. Both three-lobe and two-lobe machines are generally useful with two-lobe machines generally preferred due to their higher throughput rates. Ring extruders, such as those manufactured by 3+ Extruder GmbH, are also useful and typically comprise a ring of three to twelve small screws or grooved rolls around a static rod or core. The screws co rotate and intermesh on two sides providing good dispersive and distributive mixing as well as the ability to control the residence time of the material in the extruder. The intermeshing design also provides two clean wipes to the screw's shear, mixing, and kneading elements. In one embodiment, the extruder is a Toshiba TEM50A twin screw extruder.

The extruder length should be sufficient to allow for melting and intimate admixing of the polymeric components and any additional additives as well as optionally venting of the melt mixture. Extruders as short as five barrel sections may be employed, although longer extruders are also useful.

The melt filtration system is incorporated into a conventional extruder assembly. The melt filter is preferably positioned after the terminal barrel of the extruder, and more preferably, after the die head of the extruder. The extruder may comprise a single melt filtration system or multiple melt filtration systems, including combinations of different types of melt filtration systems.

Suitable melt filtration systems include filters. Filters may be made from a variety of materials such as, but not limited to sieves, sintered-metal filters, metal mesh or screen filters, fiber metal felt filters, ceramic filters, or a combination of the foregoing materials, and the like.

Any geometry or shape of melt filter that can be incorporated into a conventional extrusion assembly may be used. Thus, the melt filter can be in the form of a cone, pleated, candle, stack, flat, wraparound, screens, cartridge, or pack disc, and the like, and combinations thereof. The selection of the geometry can vary depending on various parameters such as, for example, the size of the extruder and the throughput rate desired as well as the degree of particle filtration that is desired. Exemplary materials of construction include stainless steels, titanium, nickel, as well as other metals alloys. Various weaves of wire fabric including plain, dutch, square, twill and combinations of weaves can be used. Especially useful are filters that have been designed to minimize internal volume and low flow areas and to withstand repeated cleaning cycles.

The melt filtration system may include a periodic or continuous screen changing filter or batch filters. For example, continuous screen changing filters may include a ribbon of screen filter that is slowly passed into the path of a melt flow in an extruder. The melt mixture passes through the filter and the filter collects particulate impurities within the melt and these impurities are carried out of the extruder with the filter ribbon as it is periodically or continuously renewed with a new section of ribbon.

In one embodiment, the melt filtration system comprises a single filter or a combination of two or more filters. Typically, the melt filtration system comprises two and preferably three filters that, in sequence, form a "filter sandwich," where a filter with small pore size is sandwiched between two filters with larger pore size. The pore size of the interior melt filter of the "filter sandwich" may be about 105 to 53 micrometers, corresponding to a 140 to 270 mesh filter. Within this range, a pore size of 74 micrometers, corresponding to a 200 mesh filter is preferred. The exterior filters of the "filter sandwich" have larger pore sizes, as stated previously, which may be the same or different and typically have a pore size of 1190 microns to 420 microns, corresponding to 16 mesh to 40 mesh filters. Preferably the pore size of each of the exterior filters is 841 micrometers, corresponding to a 20 mesh filter.

The filters that are used in the melt filtration process are commercially available and purchased separately, for instance, from Taiyo Wire Cloth Co. Ltd. or Ishikawa Wire Netting Co. Ltd., both of Japan. The mesh type is typically plain weave. For a 200 mesh screen, the opening size is 74 micrometers and the wire width is 0.05 mm. For the 20 mesh screen, the opening size is 841 micrometer mm and the wire width is 0.5 mm. The filter sandwiched is typically located between the die head and terminal barrel of the extruder instead of using a breaker plate.

The temperature of the melt filtration system is sufficient to maintain the material in a molten state and at a sufficiently low viscosity for the material to pass through the filter without excessive pressure drop. Generally useful temperatures are 260° C. to 380° C. Within this range a temperature of less than or equal to 340° C., or, more specifically, less than or equal to 320° C. may be employed. Also within this range a temperature of greater than or equal to 280° C. or, more specifically, greater than or equal to 290° C. may be employed.

Halogen-Free

"Halogen-free" means that no halogen-containing component is intentionally added to the polymeric composition. In practice, "halogen-free" means a composition that comprises less than 100 parts per million by weight of total fluorine, chlorine, bromine, and iodine as determined, for example, by Inductively Coupled Plasma Atomic Absorption Spectroscopy is considered halogen-free. In some embodiments, the composition comprises less than 50 parts per million by weight of total fluorine, chlorine, bromine, and iodine.

Composition Components

Poly(arylene ether)

The composition comprises at least one poly(phenylene ether) resin. Although all conventional poly(phenylene ether)s can be employed with the present invention, polyphenylene ethers ("PPE") are preferred. Poly(arylene ether)s are known polymers comprising a plurality of structural units of the formula:

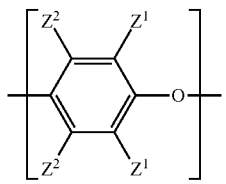

wherein for each structural unit, each $Z^1$ is independently $C_1$-$C_{12}$ hydrocarbylthio (that is, ($C_1$-$C_{12}$ hydrocarbyl)S—), $C_1$-$C_{12}$ hydrocarbyloxy, or unsubstituted or substituted $C_1$-$C_{12}$ hydrocarbyl provided that the hydrocarbyl group is not tertiary hydrocarbyl; and each $Z^2$ is independently hydrogen, $C_1$-$C_{12}$ hydrocarbylthio, $C_1$-$C_{12}$ hydrocarbyloxy, or unsubstituted or substituted $C_1$-$C_{12}$ hydrocarbyl provided that the hydrocarbyl group is not tertiary hydrocarbyl. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue may also contain one or more carbonyl groups, amino groups, hydroxyl groups, or the like, or it may contain heteroatoms within the backbone of the hydrocarbyl residue. As one example, $Z^1$ may be a di-n-butylaminomethyl group formed by reaction of a terminal 3,5-dimethyl-1,4-phenyl group with the di-n-butylamine component of an oxidative polymerization catalyst.

In some embodiments, the poly(phenylene ether) comprises 2,6-dimethyl-1,4-phenylene ether units, 2,3,6-trimethyl-1,4-phenylene ether units, or a combination thereof. In some embodiments, the poly(phenylene ether) is a poly(2,6-dimethyl-1,4-phenylene ether).

The poly(phenylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a copolymer, a graft copolymer, an ionomer, or a block copolymer, as well as combinations comprising at least one of the foregoing.

In some embodiments, the poly(phenylene ether) has an intrinsic viscosity of about 0.1 to about 1 deciliter per gram measured at 25° C. in chloroform. Specifically, the poly(phenylene ether) intrinsic viscosity may be about 0.2 to about 0.8 deciliter per gram, more specifically about 0.3 to about 0.6 deciliter per gram, and more specifically about 0.37 to about 0.47 deciliter per gram.

The poly(phenylene ether) is typically prepared by the oxidative coupling of at least One monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

It will be apparent to those skilled in the art from the foregoing that the poly(phenylene ether)s include all those presently known, irrespective of variations in structural units or ancillary chemical features.

In embodiment, the poly(phenylene ether) is poly(2,6-dimethyl-1,4-phenylene ether), CAS Reg. No. 24938-67-8. A suitable amount of poly(phenylene ether) in the composition is about 70 to about 90 weight percent. In one embodiment, the amount is 80 to 90 percent by weight. In another embodiment, the amount is about 70 to about 80 by weight. In another embodiment, the amount is about 72 to about 88 by weight. In another embodiment, the amount is about 74 to about 86 by weight.

In one embodiment, the poly(phenylene ether) is poly(2,6-dimethyl-1,4-phenylene ether) having an intrinsic viscosity of approximately 0.29-0.49 dL/g as measured in chloroform at 25° C. In another embodiment, the poly(phenylene ether) is poly(2,6-dimethyl-1,4-phenylene ether) having an intrinsic viscosity of approximately 0.37-0.47 dL/g as measured in chloroform at 25° C. In another embodiment, the poly(phenylene ether) is poly(2,6-dimethyl-1,4-phenylene ether) having an intrinsic viscosity of approximately 0.375-0.425 dL/g as measured in chloroform at 25° C. In another embodiment, the poly(phenylene ether) is poly(2,6-dimethyl-1,4-phenylene ether) having an intrinsic viscosity of approximately 0.40 dL/g as measured in chloroform at 25° C. In another embodiment, the poly(phenylene ether) is poly(2,6-dimethyl-1,4-phenylene ether) having an average intrinsic viscosity of approximately 0.40 dL/g as measured in chloroform at 25° C. In another embodiment, the poly(phenylene ether) is poly(2,6-dimethyl-1,4-phenylene ether) having an intrinsic viscosity of approximately 0.46 dL/g as measured in chloroform at 25° C. In another embodiment, the poly(phenylene ether) is poly(2,6-dimethyl-1,4-phenylene ether) having an average intrinsic viscosity of approximately 0.46 dL/g as measured in chloroform at 25° C.

Poly(phenylene ether)-Polysiloxane Copolymer

In another embodiment, the composition comprises a mixture of a poly(phenylene ether) homopolymer and a poly(phenylene ether) polysiloxane copolymer. The poly(phenylene ether)-polysiloxane copolymer can be a block copolymer. The poly(phenylene ether) polysiloxane block copolymer comprises a poly(phenylene ether) block and a polysiloxane block such as described in U.S. Pat. No. 8,017,697.

The block copolymer comprising a poly(phenylene ether) block and a polysiloxane block comprises, on average, 35 to 80 siloxane repeating units, 1 to 8 weight percent siloxane repeating units and 12 to 99 weight percent arylene ether repeating units. The mixture is the product of a process comprising oxidatively copolymerizing a monomer mixture comprising a monohydric phenol and a hydroxyaryl-terminated polysiloxane. The block copolymer typically has a weight average molecular weight of at least 30,000 atomic mass units.

The poly(phenylene ether) homopolymer that is part of the mixture is the product of polymerizing a monohydric phenol alone and is a by-product of the block copolymer synthesis. When the monohydric phenol consists of a single compound (for example, 2,6-dimethylphenol, although other substituted monhydric phenols may also be used), the poly(phenylene ether) is the product of homopolymerizing that single monohydric phenol. When the monohydric phenol comprises two or more distinct monohydric phenol species (for example, a mixture of 2,6-dimethylphenol and 2,3,6-trimethylphenol), the poly(phenylene ether) is the product of copolymerizing the two or more distinct monohydric phenol species. Using nuclear magnetic resonance methods, it has not been possible to allocate the phenylene ether residues between poly(phenylene ether) and poly(phenylene ether)-polysiloxane block copolymer. However, the presence of poly(phenylene ether) is inferred from the presence of "tail" groups as defined below (e.g., 2,6-dimethylphenoxy groups when the monohydric phenol is 2,6-dimethylphenol) and/or the presence of "biphenyl" groups as defined below (e.g., the residue of 3,3',5,5'-tetramethyl-4,4'-biphenol) in the isolated product.

In addition to the poly(phenylene ether) homopolymer, the mixture comprises a poly(phenylene ether)-polysiloxane block copolymer. The poly(phenylene ether)-polysiloxane block copolymer comprises a poly(phenylene ether) block and a polysiloxane block. The poly(phenylene ether) block is a residue of the polymerization of the monohydric phenol. In some embodiments, the poly(phenylene ether) block comprises arylene ether repeating units having the structure:

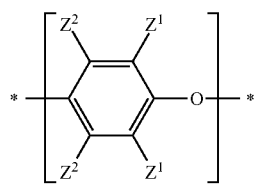

wherein for each repeating unit, each $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_1$-$C_{12}$ halohydrocarbyloxy wherein at least two carbon atoms separate the halogen and oxygen atoms; and each $Z_2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_1$-$C_{12}$ halohydrocarbyloxy wherein at least two carbon atoms separate the halogen and oxygen atom.

In some embodiments, the poly(phenylene ether) block comprises 2,6-dimethyl-1,4-phenylene ether repeating units, that is, repeating units having the structure:

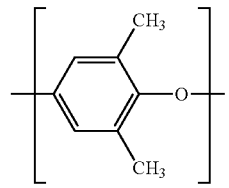

or 2,3,6-trimethyl-1,4-phenylene ether repeating units, or a combination thereof.

The polysiloxane block is a residue of the hydroxyaryl-terminated polysiloxane. In some embodiments, the polysiloxane block comprises repeating units having the structure:

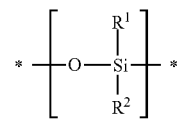

wherein each occurrence of $R^1$ and $R^2$ is independently hydrogen, $C_1$-$C_{12}$ hydrocarbyl or $C_1$-$C_{12}$ halohydrocarbyl; and the polysiloxane block further comprises a terminal unit having the structure:

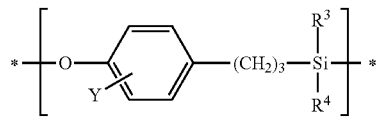

wherein Y is hydrogen, $C_1$-$C_{12}$ hydrocarbyl, $C_1$-$C_{12}$ hydrocarbyloxy, or halogen, and wherein each occurrence of $R^3$ and $R^4$ is independently hydrogen, $C_1$-$C_{12}$ hydrocarbyl or $C_1$-$C_{12}$ halohydrocarbyl. In some embodiments, $R^1$ and $R^2$ are $C_1$-$C_6$ alkyl, specifically $C_1$-$C_3$ alkyl, more specifically methyl. In some embodiments, the polysiloxane repeating units comprise dimethylsiloxane (—Si(CH$_3$)$_2$O—) units. In some embodiments, the polysiloxane block has the structure:

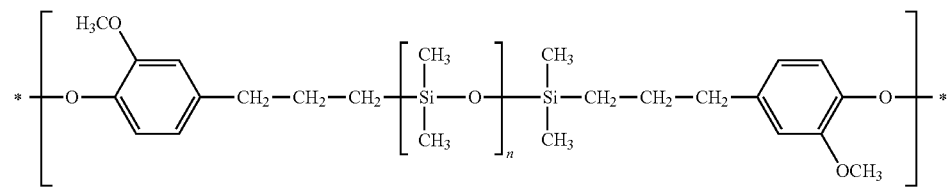

wherein n is 35 to 60.

The hydroxyaryl-terminated polysiloxane comprises at least one hydroxyaryl terminal group. In some embodiments, the hydroxyaryl-terminated polysiloxane has a single hydroxyaryl terminal group, in which case a poly(phenylene ether)-polysiloxane diblock copolymer is formed. In other embodiments, the hydroxyaryl-terminated polysiloxane has two hydroxyaryl terminal groups, in which case poly(phenylene ether)-polysiloxane diblock and/or triblock copolymers are formed. It is also possible for the hydroxyaryl-terminated polysiloxane to have a branched structure that allows three or more hydroxyaryl terminal groups and the formation of corresponding branched copolymers.

As noted above, the polysiloxane block comprises, on average, 35 to 80 siloxane repeating units. Within this range, the number of siloxane repeating units can be 35 to 60, more specifically 40 to 50. The number of siloxane repeating units in the polysiloxane block is essentially unaffected by the copolymerization and isolation conditions, and it is therefore equivalent to the number of siloxane repeating units in the hydroxyaryl-terminated polysiloxane starting material. When not otherwise known, the average number of siloxane repeating units per hydroxylaryl-terminate polysiloxane molecule can be determined by NMR methods that compare the intensity of signals associated with the siloxane repeating units to those associated with the hydroxyaryl terminal groups. For example, when the hydroxyaryl-terminated polysiloxane is a eugenol-capped polydimethylsiloxane, it is possible to determine the average number of siloxane repeating units by a proton nuclear magnetic resonance ($^1$H NMR) method in which integrals for the protons of the dimethylsiloxane resonance and the protons of the eugenol methoxy group are compared.

The mixture of a poly(phenylene ether) homopolymer and a poly(phenylene ether) polysiloxane block copolymer comprises 1 to 8 weight percent siloxane repeating units and 12 to 99 weight percent arylene ether repeating units, based on the total weight of the thermoplastic composition. Within these ranges, the weight percent of siloxane repeating units can be 2 to 7 weight percent, specifically 3 to 6 weight percent, more specifically 4 to 5 weight percent; and the weight percent arylene ether repeating units can be 50 to 98 weight percent, specifically 70 to 97 weight percent, more specifically 90 to 96 weight percent.

As mentioned above, the mixture of a poly(phenylene ether) homopolymer and a poly(phenylene ether) polysiloxane block copolymer is the product of a process comprising oxidatively copolymerizing a monomer mixture comprising a monohydric phenol and a hydroxyaryl-terminated polysiloxane. As such, the process is simpler than poly(phenylene ether)-polysiloxane block copolymer synthesis methods that require the coupling of pre-formed poly(phenylene ether) and polysiloxane blocks.

The mixture as described herein comprising the poly(phenylene ether) homopolymer and a poly(phenylene ether) polysiloxane block copolymer has a weight average molecular weight of at least 30,000 atomic mass units. In some embodiments the weight average molecular weight is 30,000 to 150,000 atomic mass units. Specifically 35.000 to 120,000 atomic mass units, more specifically 40,000 to 90,000 atomic mass units, even more specifically 45,000 to 70,000 atomic mass units. In some embodiments, the number average molecular weight is 10,000 to 50,000 atomic mass units, specifically 10,000 to 30,000 atomic mass units, more specifically 14,000 to 24.000 atomic mass units. Chromatographic methods are available for determining molecular weight.

The mixture can also include relatively small amounts of very low molecular weight species. Thus, in some embodiments, the mixture comprises less than 25 weight percent of molecules having a molecular weight less than 10,000 atomic mass units, specifically 5 to 25 weight percent of molecules having a molecular weight less than 10,000 atomic mass units, more specifically 7 to 21 weight percent of molecules having a molecular weight less than 10,000 atomic mass units. In some embodiments, the molecules having a molecular weight less than 10,000 atomic mass units comprise, on average, 5 to 10 weight percent siloxane repeating units, specifically 6 to 9 weight percent siloxane repeating units.

Similarly, the mixture can also include relatively small amounts of very high molecular weight species. Thus, in some embodiments, mixture comprises less than 25 weight percent of molecules having a molecular weight greater than 100,000 atomic mass units, specifically 5 to 25 weight percent of molecules having a molecular weight greater than 100,000 atomic mass units, more specifically 7 to 23 weight percent of molecules having a molecular weight greater than 100,000 atomic mass units. In some embodiments, the molecules having a molecular weight greater than 100,000 atomic mass units comprise, on average, 3 to 6 weight percent siloxane repeating units, specifically 4 to 5 weight percent siloxane repeating units.

In some embodiments, the mixture of a poly(phenylene ether) homopolymer and a poly(phenylene ether) polysiloxane block copolymer has an intrinsic viscosity of at least 0.3 deciliter per gram, as measured at 25° C. In chloroform. The intrinsic viscosity can be 0.3 to 0.6 deciliter per gram, specifically 0.3 to 0.5 deciliter per gram, still more specifically 0.31 to 0.55 deciliter per gram, yet more specifically 0.35 to 0.47 deciliter per gram, and yet more specifically 0.385 to 0.425 deciliter per gram.

One indication of the efficiency with which the hydroxyaryl-terminated polysiloxane is incorporated into block copolymer is the low concentration of so-called poly (phenylene ether) "tail" groups. In a homopolymerization of 2,6-dimethylphenol, a large fraction of product molecules have a so-called head-to-tail structure in which the linear product molecule is terminated on one end by a 3,5-dimethyl-4-hydroxyphenyl "head" and on the other end by a 2,6-dimethylphenoxy "tail". Thus, when the monohydric phenol consists of 2,6-dimethylphenol, the poly(phenylene ether) tail group has the structure:

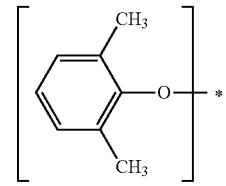

wherein the 3-, 4-, and 5-positions of the ring are substituted with hydrogen atoms. (that is, the term 2,6-dimethylphenoxy does not encompass divalent 2,6-dimethyl-1,4-phenylene ether groups). In a copolymerization of monohydric phenol with hydroxyaryl-terminated polysiloxane, incorporation of the hydroxyaryl-terminated polysiloxane into block copolymer will reduce the concentration of arylene ether "tail" groups. Thus, in some embodiments, the monohydric phenol consists of 2,6-dimethylphenol, and the thermoplastic composition of comprises less than or equal to 0.4 weight percent, specifically 0.2 to 0.4 weight percent, of 2,6-dimethylphenoxy groups, based on the weight of the thermoplastic composition.

The mixture containing the poly(phenylene ether)-polysiloxane block coplymer can further include groups derived from a diphenoquinone, which is itself an oxidation product of the monohydric phenol. For example, when the monohydric phenol is 2,6-dimethylphenol, the poly(phenylene ether)-polysiloxane can comprise 1.1 to 2.0 weight percent of 2,6-dimethyl-4-(3,5-dimethyl-4-hydroxyphenyl)phenoxy groups.

The mixture can be isolated from solution by an isolation procedure that minimizes volatile and nonvolatile contaminants. For example, in some embodiments, the poly(phenylene ether)-polysiloxane copolymer comprises less than or equal to 1 weight percent of total volatiles, specifically 0.2 to 1 weight percent of total volatiles, determined according to the procedure in the working examples below. In some embodiments, the monomer mixture is oxidatively copolymerized in the presence of a catalyst comprising a metal (such as copper or manganese), and the poly(phenylene ether)-polysiloxane copolymer comprises less than or equal to 100 parts per million by weight of the metal, specifically 5 to 100 parts per million by weight of the metal, more specifically 10 to 50 parts per million by weight of the metal, even more specifically 20 to 50 parts by weight of the metal.

The mixture containing the poly(phenylene ether)-polysiloxane can be prepared by a method comprising oxidatively copolymerizing a monohydric phenol and a hydroxyaryl-terminated polysiloxane to form a poly(phenylene ether)-polysiloxane; wherein the oxidative copolymerization is conducted with a reaction time greater than or equal to 80 minutes; wherein the hydroxyaryl-terminated polysiloxane comprises, on average, 35 to 80 siloxane repeating units and the hydroxyaryl-terminated polysiloxane constitutes 1 to 8 weight percent of the combined weight of the monohydric phenol and the hydroxyaryl-terminated polysiloxane.

In other embodiments, the hydroxyaryl-terminated polysiloxane comprises, on average, 35 to 80 siloxane repeating units; and wherein the hydroxyaryl-terminated polysiloxane constitutes more than 20 and up to 80 weight percent of the combined weight of the monohydric phenol and the hydroxyaryl-terminated polysiloxane.

In some embodiments, the hydroxyaryl-terminated polysiloxane comprises, on average, 40 to 70 siloxane repeating units, specifically 40 to 60 siloxane repeating units, more specifically 40 to 50 siloxane repeating units.

As noted above, in one embodiment, the hydroxyaryl-terminated polysiloxane constitutes 1 to 8 weight percent, 9 to 20 percent, and more than 20 and up to 80 percent of the combined weight of the monohydric phenol and the hydroxyaryl-terminated polysiloxane. Within this range, the hydroxyaryl-terminated polysiloxane can constitute 2 to 7 weight percent, specifically 3 to 6 weight percent, more specifically 4 to 6 weight percent of the combined weight of the monohydric phenol and the hydroxyaryl-terminated polysiloxane.

In some embodiments, the oxidative copolymerization is initiated in the presence of at least 50 weight percent of the hydroxyaryl-terminated polysiloxane, specifically at least 90 weight percent of the hydroxyaryl-terminated polysiloxane, more specifically 100 weight percent of the hydroxyaryl-terminated polysiloxane.

In some embodiments, the oxidative copolymerization is initiated in the presence of 0 to 50 weight percent of the monohydric phenol, specifically 1 to 30 weight percent of the monohydric phenol, more specifically 2 to 20 weight percent of the monohydric phenol, even more specifically 5 to 10 weight percent of the monohydric phenol.

The oxidative copolymerization is conducted with a reaction time greater than or equal between about 80 and 100 minutes. The reaction time is the elapsed time between initiation and termination of oxygen flow. For brevity, the description herein repeatedly refers to "oxygen" or "oxygen flow", it will be understood that any oxygen containing gas, including air, can be used as the oxygen source.) In some embodiments, the reaction time is 110 to 300 minutes, specifically 140 to 250 minutes, more specifically 170 to 220 minutes.

The oxidative copolymerization can include a "build time" which is the time between completion of monomer addition and termination of oxygen flow. In some embodiments, the reaction time comprises a build time of 80 to 160 minutes. In some embodiments, the reaction temperature during at least part of the build time can be 40 to 60° C., specifically 45 to 55° C.

After termination of the copolymerization reaction, the mixture can be isolated from solution using methods known in the art for isolating poly(phenylene ether)s from solution. For example, the poly(phenylene ether)-polysiloxane copolymer can be isolated by precipitation with an antisolvent, such as a $C_1$-$C_6$ alkanol, including methanol, ethanol, n-propanol, and isopropanol. The present inventors have observed that the use of isopropanol is advantageous because it is a good solvent for unreacted hydroxyaryl-terminated polysiloxane. Therefore, precipitation and washing with isopropanol substantially removes hydroxyaryl-terminated polysiloxane from the isolated product. As an alternative to precipitation, the poly(phenylene ether)-polysiloxane copolymer can be isolated by direct isolation methods, including devolatilizing extrusion.

In some embodiments, the poly(phenylene ether)-polysiloxane comprises 1 to 8 weight percent siloxane repeating units.

In some embodiments, the poly(phenylene ether)-polysiloxane copolymer has a weight average molecular weight of at least 30,000 atomic mass units, specifically 30,000 to 150,000 atomic mass units, more specifically 35,000 to 120,000 atomic mass units, even more specifically 40,000 to 90,000 atomic mass units, yet more specifically 45,000 to 70,000 atomic mass units.

In a very specific embodiment, the poly(phenylene ether)-polysiloxane copolymer has an intrinsic viscosity of about 0.385-0.425 dL/g and a weight percent of incorporated siloxane of at least about 4-6 percent. In another embodiment, the poly(phenylene ether)-polysiloxane copolymer has an intrinsic viscosity of about 0.41 dL/g. In another very specific embodiment, the poly(phenylene ether)-polysiloxane copolymer is described as Example 16 in U.S. Pat. No. 8,017, 697. Thus, in one embodiment, the poly(phenylene ether)-polysiloxane copolymer has an intrinsic viscosity of about 0.39 dL/g and a weight percent of incorporated siloxane of at least about 4.78 percent.

In some embodiments, the composition of the present invention contains about 5 to about 55 weight percent, and more specifically about 10 to about 40 weight percent of the poly(phenylene ether)-polysiloxane copolymer. More specifically, the composition of the present invention contains about 10 to about 25 weight percent and more specifically about 15 to about 25 weight percent of the poly(phenylene ether)-polysiloxane copolymer.

Styrenic Polymer

In addition to the poly(phenylene ether), the composition further comprises at least one styrenic polymer. The term "styrenic polymer" as used herein includes styrenic polymers prepared by methods known in the art including bulk, suspension and emulsion polymerization, which contain at least 25 weight percent of structural units derived from monomer of the formula:

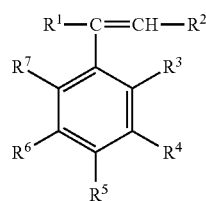

wherein $R^1$ and $R^2$ each independently represent a hydrogen atom, a $C_1$-$C_8$ alkyl group, or a $C_1$-$C_8$ alkenyl group; $R^3$ and $R^7$ each independently represent a hydrogen atom, or a $C_1$-$C_8$ alkyl group; and $R^4$, $R^5$, and $R^6$ each independently represent a hydrogen atom, a $C_1$-$C_8$ alkyl group, or a $C_2$-$C_8$ alkenyl group, or $R^3$ and $R^4$ are taken together with the central aromatic ring to form a naphthyl group. Specific alkenyl aromatic monomers include, for example, styrene and methylstyrenes such as alpha-methylstyrene and p-methylstyrene. In some embodiments, the alkenyl aromatic monomer is styrene. In one embodiment, the polystyrene is general purpose polystyrene (GPPS). In another embodiment, the polystyrene is high impact polystyrene HIPS).

In one embodiment, the styrenic polymer comprises a hydrogenated block copolymer. The conjugated diene used to prepare the hydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, and combinations thereof. In some embodiments, the conjugated diene is 1,3-butadiene, 2-methyl-1,3-butadiene, or a combination thereof. In some embodiments, the conjugated diene consists of 1,3-butadiene.

The hydrogenated block copolymer is a copolymer comprising (A) at least one block derived from an alkenyl aromatic compound and (B) at least one block derived from a conjugated diene, in which the aliphatic unsaturated group content in the block (B) is at least partially reduced by hydrogenation. In some embodiments, the aliphatic unsaturation in the (B) block is reduced by at least 50 percent, specifically at least 70 percent. The arrangement of blocks (A) and (B) includes a linear structure, a grafted structure, and a radial teleblock structure with or without a branched chain. Linear block copolymers include tapered linear structures and non-tapered linear structures. In some embodiments, the hydrogenated block copolymer has a tapered linear structure. In some embodiments, the hydrogenated block copolymer has a non-tapered linear structure. In some embodiments, the hydrogenated block copolymer comprises a B block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B, wherein the molecular weight of each A block may be the same as or different from that of other A blocks, and the molecular weight of each B block may be the same as or different from that of other B blocks. In some embodiments, the hydrogenated block copolymer is a diblock copolymer, a triblock copolymer, or a combination thereof. In some embodiments, the hydrogenated block copolymer is a polystyrene-poly(ethylene-butylene)-polystyrene triblock copolymer.

In some embodiments, the hydrogenated block copolymer excludes the residue of monomers other than the alkenyl aromatic compound and the conjugated diene. In some embodiments, the hydrogenated block copolymer consists of blocks derived from the alkenyl aromatic compound and the conjugated diene. It does not comprise grafts formed from these or any other monomers. It also consists of carbon and hydrogen atoms and therefore excludes heteroatoms.

Suitable unsaturated styrenic block copolymers may have number average molecular weights of about 50,000 to about 200,000, with molecular weights of about 80,000 to about 150,000 being preferred, and molecular weights of about 100,000 to about 130,000 being more preferred. The unsaturated styrenic block copolymer may be present in an amount of about 0.1 to about 10 weight percent, preferably about 0.3 to about 5 weight percent, more preferably about 0.5 to about 2 weight percent, based on the weight of the entire composition. Suitable saturated styrenic block copolymers may have number average molecular weights of about 50,000 to about 500,000, with molecular weights of about 100,000 to about 400,000 being preferred and molecular weights of about 200,000 to about 300,000 being more preferred. The optional styrenic block copolymers may be present in an amount of about 1 to about 15 weight percent, preferably about 3 to about 10 weight percent, more preferably about 5 to about 8 weight percent, based on the weight of the entire composition.

In some embodiments, the hydrogenated block copolymer includes the residue of one or more acid functionalizing agents, such as maleic anhydride.

Methods of preparing hydrogenated block copolymers are known in the art and many hydrogenated block copolymers are commercially available, including Phillips Petroleum under the trademark SOLPRENE®, Shell Chemical Company under the trademark KRATON®, and Kuraray under the trademark SEPTON®. Suitable materials include the unsaturated styrenic block copolymers in the KRATON® D series (styrene-butadiene-styrene (SBS) and styrene-isoprene-styrene (SIS)), and the saturated styrenic block copolymers in the KRATON® G series (styrene-ethylene/butylene-styrene (SEBS) and styrene-ethylene/propylene-styrene (SEPS).

More specifically, the hydrogenated block copolymer may be the polystyrene-poly(ethylene-propylene) diblock copolymers available from Kraton Polymers as Kraton G1701 and G1702; the polystyrene-poly(ethylene-butylene)-polystyrene triblock copolymers available from Kraton Polymers as Kraton G1641, G1650, G1651, G1654, G1657, G1726, G4609, G4610, GRP-6598, RP-6924, MD-6932M, MD-6933, and MD-6939; the polystyrene-poly(ethylene-butylene-styrene)-polystyrene (SEB/S-S) triblock copolymers available from Kraton Polymers as Kraton RP-6935 and RP-6936, the polystyrene-polyethylene-propylene)-polystyrene triblock copolymers available from Kraton Polymers as Kraton G1730; the maleic anhydride-grafted polystyrene-poly(ethylene-butylene)-polystyrene triblock copolymers available from Kraton Polymers as Kraton GI 901, GI 924, and MD-6684; the maleic anhydride-grafted polystyrene-poly(ethylene-butylene-styrene)-polystyrene triblock copolymer available from Kraton Polymers as Kraton MD-6670; the polystyrene-poly(ethylene-butylene)-polystyrene triblock copolymer comprising 67 weight percent polystyrene available from AK Elastomer as TUFTEC H 1043; the polystyrene-poly(ethylene-butylene)-polystyrene triblock copolymer comprising 42 weight percent polystyrene available from AK Elastomer as TUFTEC H1 051; the polystyrene-poly(butadiene-butylene)-polystyrene triblock copolymers available from AK Elastomer as TUFTEC P1000 and P2000; the polystyrene-polybutadiene-poly(styrene-butadiene)-polybutadiene block copolymer available from AK Elastomer as S.O.E.-SS L601; the hydrogenated radial block copolymers available from Chevron Phillips Chemical Company as K-Resin KK38, KR01, KR03, and KR05; the polystyrene-poly(ethylene-butylene)-polystyrene triblock copolymer comprising about 60 weight polystyrene available from Kuraray as SEPTON S8104; the polystyrene-poly(ethylene-ethylene/propylene)-polystyrene triblock copolymers available from Kuraray as SEPTON S4044, S4055, S4077, and S4099; and the polystyrene-poly(ethylene-propylene)-polystyrene triblock copolymer comprising about 65 weight percent polystyrene available from Kuraray as SEPTON S2104. Mixtures of two of more hydrogenated block copolymers may be used.

In one embodiment, the hydrogenated block copolymer is the polystyrene-poly(ethylene-butylene)-polystyrene triblock copolymes available from Kraton Polymers as Kraton G1651.

The composition and film produced therefrom comprises the hydrogenated block copolymer in an amount of about 3 to about 23 weight percent, based on the total weight of the film. Specifically, the hydrogenated block copolymer concentration may be about 4 to about 8 weight percent, more specifically about 5 to about 7 weight percent.

Flame Retardant

The composition of the present invention further comprises one or more flame retardants, wherein at least one flame retardant is an organic phosphate. The organic phosphate can be an aromatic phosphate: compound of the formula:

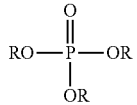

where each R is independently an alkyl, cycloalkyl, aryl, alkyl substituted aryl, halogen substituted aryl, aryl substituted alkyl, halogen, or a combination of any of the foregoing, provided at least one R is aryl or alkyl substituted aryl.

Examples include phenyl bisdodecyl phosphate, phenyl-bisneopentyl phosphate, phenyl-bis(3,5,5'-tri-methyl-hexyl phosphate), ethyldiphenyl phosphate, 2-ethyl-hexyldi(p-tolyl)phosphate, bis-(2-ethylhexyl)p-tolylphosphate, tritolyl phosphate, bis-(2-ethylhexyl)phenyl phosphate, tri-(nonylphenyl)phosphate, di(dodecyl)p-tolyl phosphate, tricresyl phosphate, triphenyl phosphate, dibutylphenyl phosphate, 2-chloroethyldiphenyl phosphate, p-tolyl bis(2,5,5'-trimethylhexyl)phosphate, 2-ethylhexyldiphenyl phosphate, and the like. In some embodiments the phosphate is one in which each R is aryl and/or alkyl substituted aryl, such as triphenyl phosphate and tris(alkyl phenyl)phosphate.

Alternatively, the organic phosphate can be a di- or polyfunctional compound or polymer having one of the following formulas:

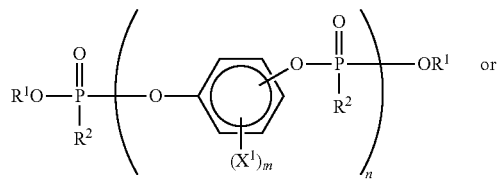

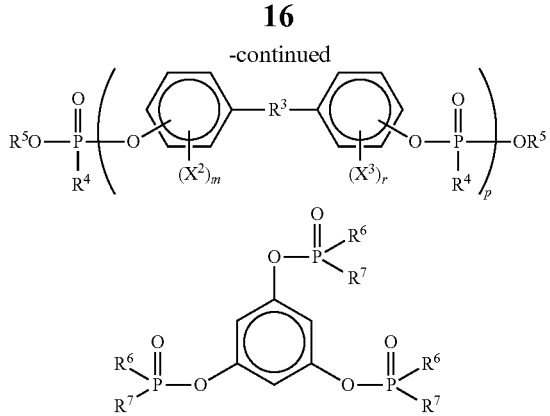

including mixtures thereof, in which $R^1$, $R^3$ and $R^5$ are, independently, hydrocarbon; $R^2$, $R^4$, $R^6$ and $R^7$ are, independently, hydrocarbon or hydrocarbonoxy; $X^1$, $X^2$ and $X^3$ are, independently, halogen; m and r are 0 or integers from 1 to 4, and n and p are from 1 to 30.

Examples include the bis diphenyl phosphates of resorcinol, hydroquinone and bisphenol-A, respectively, or their polymeric counterparts. Methods for the preparation of the aforementioned di- and polyfunctional aromatic phosphates are described in British Patent No. 2,043,083.

Exemplary organic phosphates include, but are not limited to, phosphates containing substituted phenyl groups, phosphates based upon resorcinol such as, for example, resorcinol bis-diphenylphosphate, as well as those based upon bis-phenols such as, for example, bis-phenol A bis-diphenylphosphate. In some embodiments, the organic phosphate is selected from tris(butyl phenyl)phosphate (for example, CAS No. 89492-23-9, and 78-33-1), resorcinol bis-diphenylphosphate (RDP, CAS No. 57583-54-7), bis-phenol A bis-diphenylphosphate (BDADP, CAS No. 181028-79-5), triphenyl phosphate (for example, CAS No. 115-86-6); tris(isopropyl phenyl)phosphate (for example, CAS No. CAS No. 68937-41-7) and mixtures of two or more of the foregoing.

In one embodiment, the composition comprises 1 to 15 percent by weight of the flame retardant. More specifically, the composition comprises 3 to 13 percent by weight of the flame retardant. More specifically, the composition comprises 5 to 11 percent by weight of the flame retardant. In one embodiment, the flame retardant comprises RDP either alone or in combination with one or more additional flame retardants. In another embodiment, the flame retardant comprises BDADP either alone or in combination with one or more additional flame retardants.

Other Flame Retardants

In other embodiments, the invention may optionally comprise one or more additional flame retardants selected from the group consisting of other metal hydroxides, phosphoric acid salts, organic phosphates, and phosphinates and phosphonates, all of which are described below.

Metal Hydroxides

Suitable metal hydroxides include all those capable of providing fire retardance, as well as combinations thereof. The metal hydroxide can be chosen to have substantially no decomposition during processing of the tire additive composition and/or flame retardant thermoplastic composition. Substantially no decomposition is defined herein as amounts of decomposition that do not prevent the flame retardant additive composition from providing the desired level of tire retardance. Exemplary metal hydroxides include, but are not limited to), aluminum hydroxide (for example, CAS No. 21645-51-2), cobalt hydroxide (for example. CAS No. 21041-93-0)

and combinations of two or more of the foregoing. In some embodiments, the metal hydroxide comprises magnesium hydroxide. In some embodiments the metal hydroxide has an average particle size less than or equal to 10 micrometers and/or a purity greater than or equal to 90 weight percent. In some embodiments it is desirable for the metal hydroxide to contain substantially no water, i.e. a weight loss of less than 1 weight percent upon drying at 120° C. for 1 hour. In some embodiments the metal hydroxide can be coated, for example, with stearic acid or other fatty acids. In other embodiments, the metal hydroxide is coated with an aminosilane.

Phosphoric Acid Salts

In some embodiments, the flame retardant comprises one or more phosphoric acid salts.

As mentioned above, the phosphoric acid salt can be selected from the group consisting of melamine phosphate (for example, CAS No. 20208-95-1), melamine pyrophosphate (for example, CAS No. 15541-60-3), melem polyphosphate, melam polyphosphate, melamine orthophosphate (for example, CAS No. 20208-95-1), monoammonium phosphate (for example, CAS No. 7722-76-1), diammonium phosphate (for example, CAS No. 7783-28-0), phosphoric acid amide (for example, CAS No. 680-31-9), melamine polyphosphate (for example, CAS No. 218768-84-4 or 56386-64-2), ammonium polyphosphate (for example, CAS No. 68333-79-9), polyphosphoric acid amide and combinations of two or more of the foregoing phosphoric acid salts. The phosphoric acid salt can be surface coated with one or more of compounds selected from melamine monomer, melamine resin, modified melamine resin, guanamine resin, epoxy resin, phenol resin, urethane resin, urea resin, silicone resin, and the like. The identity of the surface coating, when present, is typically chosen based upon the identity of the thermoplastic components of the flame retardant thermoplastic composition. In some embodiments the phosphoric acid salt comprises melamine polyphosphate. In some embodiments the phosphoric acid salt comprises a combination of melamine polyphosphate and melamine phosphate.

Phosphoric acid salts are commercially available or can be synthesized by the reaction of a phosphoric acid with the corresponding amine containing compound as is taught in the art.

Phosphonate and Phosphonate Salts

In some embodiments, the flame retardant comprises one or more metal salts of phosphinates and phosphonates (so-called "metallophophorous" flame retardants). The metal component of the metal phosphinate or phosphonate salt can be a cation of Mg, Ca, Al, Sb, Sn, Ge, Ti, Zn, Fe, Zr, Ce, Bi, Sr, Mn, Li, Na, or K. The phosphinate or phosphonate component can be dimethylphosphinate, diethylphosphinate, di-n-propylphosphinate, di-n-butylphosphinate, di-n-hexylphosphinate, dicyclohexylphosphinate, di-2-ethylhexylphosphinate, diphenylphosphinate, di-o-tolylphosphinate, dimethylphosphonate, diethylphosphonate, di-n-propylphosphonate, di-n-butylphosphonate, di-n-hexylphosphonate, dicyclohexylphosphonate, di-2-ethylhexylphoshate, diphenylphosphonate, di-o-tolylphosphonate, dimethylphosphate, diethylphosphate, di-n-propylphosphate, di-n-butylphosphate, di-n-hexylphosphate, clicyclohexylphosphate, di-2-ethylhexylphoshate, diphenylphosphate, di-o-tolylphosphate, and the like, and mixtures thereof. A preferred metallophosphorus flame retardant is aluminum tris (diethylphosphinate). Preparation of metallophosphorus flame retardants is described, for example, in U.S. Pat. Nos. 6,255,371 and 6,547,992 to Schlosser et al., and U.S. Pat. Nos. 6,355,832 and 6,534,673 to Weferling et al.

Some of the above described components of the flame retardant additive composition are in liquid form at room temperature (25° C.) and some are solid.

Other Additives

In addition to the poly(phenylene ether) and the block copolymer, the composition comprises a plasticizer. As used herein, the term "plasticizer" refers to a compound that is effective to plasticize the composition as a whole or at least one component of the composition. In some embodiments, the plasticizer is effective to plasticize the poly(phenylene ether). The plasticizers are typically low Molecular weight, relatively nonvolatile molecules that dissolve in a polymer, separating the chains from each other and hence facilitating reptation and reducing the glass transition temperature of the composition. In some embodiments, the plasticizer has a glass transition temperature ($T_g$) of about −110 to −50° C. is miscible primarily with poly(phenylene ether)resin, and has a molecular weight less than or equal to 1,000 grams per mole.

Suitable plasticizers include, for example, benzoate esters (including dibenzoate esters), pentaerythritol esters, triaryl phosphates (including halogen substituted triaryl phosphates), phthalate esters, trimellitate esters, pyromellitate esters, and the like, and mixtures thereof.

In some embodiments, the plasticizer is a triaryl phosphate. Suitable triaryl phosphates include those having the structure.

The composition may, optionally, further comprise one or more other additives known in the thermoplastics arts. Useful additives include, for example, stabilizers, mold release agents, processing aids, drip retardants, nucleating agents, dyes, pigments, antioxidants, anti-static agents, blowing agents, metal deactivators, flow promoters, antiblocking agents, nanoclays, fragrances (including fragrance-encapsulated polymers), and the like, and combinations thereof. Additives can be added in amounts that do not unacceptably detract from the desired appearance and physical properties of the composition. Such amounts can be determined by a skilled artisan without undue experimentation.

In some embodiments, the composition can exclude or be substantially free of components other than those described above. For example, the composition can be substantially free of other polymeric materials, such as homopolystyrenes (including syndiotactic polystyrenes), polyamides, polyesters, polycarbonates, and polypropylene-graft-polystyrenes. In this context, the term "substantially free" means that none of the specified component is intentionally added.

As the composition is defined as comprising multiple components, it will be understood that each component is chemically distinct, particularly in the instance that a single chemical compound may satisfy the definition of more than one component.

It will be understood that the compositions prepared according to the present invention do not comprise tillers or reinforcing agents that are used in some other polymer compositions. Fillers or reinforcing agents typically include any materials known for these uses. For example, fillers and reinforcing agents include silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc; wollastonite; surface-treated wollastonite; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly (phenylene sulfide), polyesters, polyethylene, aromatic polyamides, aromatic polyimides, polyetherimides, polytetrafluoroethylene, acrylic resins, poly(vinyl alcohol) or the like; as well as additional tillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

Process

The invention described herein provides a process for preparing a halogen-free melt-filtered polymer composition that is fee of particulate impurities that are 0.5 mm² in size or larger, comprising compounding the composition components on an extruder equipped with a filter package, wherein the filter package is attached between the last barrel and the die head of the extruder.

Thus, in one aspect, the process for preparing a halogen-free melt-filtered polymer composition comprises: filtering the melted composition through a filter to remove particulate impurities that are 0.5 mm² in size or larger from a film fabricated with the composition which is produced in the process, wherein the composition comprises:
(a) 60 to 90 percent by weight of a poly(phenylene ether);
(b) 3 to 23 percent by weight of a styrenic polymer;
(c) 5-11 percent by weight of a halogen-free flame retardant comprising at least one organic phosphate flame retardant, wherein the composition has:
  (i) a melt viscosity of 620 Pa·s or less as measured according at 280° C. and 1500 s⁻¹; and
  (ii) a heat deflection temperature that is 135° C. or more as measured according to ASTM D648 on 6.4 mm thick bars at 1.82 MPa.

In one embodiment of this aspect, the composition is prepared using extruder.

In a further embodiment, the filter is positioned after the terminal barrel of the extruder.

In another embodiment, the filter is positioned after the die head of the extruder.

In another embodiment, the temperature of the filter is sufficient to maintain the composition in a molten state at a sufficiently low viscosity for the composition to pass through the filter means without excessive pressure drop. Generally useful temperatures are 260° C. to 380° C. Within this range a temperature of less than or equal to 340° C., or, more specifically, less than or equal to 3200° C. may be employed. Also within this range a temperature of greater than or equal to 280° C. or, more specifically, greater than or equal to 290 may be employed.

In another embodiment, the filter is selected from the group consisting of a sieve, a sintered-metal filter, metal a mesh or screen filter, a fiber metal felt filter, and ceramic filters, or a combination of thereof.

A mesh size of 200 mesh for a metal filter is an industry standard size. A well-known mesh series is the Tyler Equivalent created by the W. S. Tyler screening company. US is another well-known series that is nearly the same. Tyler mesh size is the number of openings per (linear) inch of mesh. To calculate the size of the openings in a mesh, the thickness of the wires making up the mesh material must be taken into account. The opening size of the mesh is provided so that there is no regarding the filter or filters that are being used.

As indicated previously, any suitable melt filtration system or device that can remove particulate impurities from a melt may be used. The melt filtration system of the extruder is preferably located at the terminal barrel of the extruder, and more preferably at the die head of the extruder. Preferably, the melt is filtered through a single melt filtration system, although multiple melt filtration systems are contemplated. Suitable melt filtration systems include filters made from a variety of materials such as, but not limited to, sintered-metal, metal mesh screen, fiber metal felt, ceramic, or a combination of the foregoing materials, and the like.

Any geometry of melt filter may be used including, but not limited to, cone, pleated, candle, stack, flat, wraparound, screens, a combination of the foregoing, and the like.

The melt filtration system may include a continuous screen changing filter or batch filters. For example, continuous screen changing filters may include a ribbon of screen filter that is slowly passed before the path of a melt flow in an extruder. The filter collects particulate impurities within the melt which are then carried out of the extruder with the filter ribbon as it is continuously renewed with a new section of ribbon.

As indicated, in one embodiment, the melt filtration system comprises a single filter or a combination of two or more filters. Typically, the melt filtration system comprises two and preferably three filters that, in sequence, form a "filter sandwich," where a filter with small pore size is sandwiched between two filters with larger pore size. The pore size of the interior melt filter of the "filter sandwich" may be about 105 to 53 micrometers, corresponding to a 140 to 270 mesh filter. Within this range, a pore size of 74 micrometers, corresponding to a 200 mesh filter is preferred. The exterior filters of the "filter sandwich" have larger pore sizes, as stated previously, which may be the same or different and typically have a pore size of 1190 microns to 420 microns, corresponding to 16 mesh to 40 mesh filters. Preferably the pore size of each of the exterior filters is 841 micrometers, corresponding to a 20 mesh filter.

The filters that are used in the melt filtration process are commercially available and purchased separately, for instance, from Taiyo Wire Cloth Co. Ltd. or Ishikawa Wire Netting Co. Ltd., both of Japan. The mesh type is typically plain weave. For a 200 mesh screen, the opening size is 74 micrometers and the wire width is 0.05 mm. For the 20 mesh screen, the opening size is and 841 micrometer mm and the wire width is 0.5 mm. The filter Sandwiched is typically located between the die head and terminal barrel of the extruder instead of using a breaker plate.

In another embodiment, a melt pump or gear pump is used in combination with the extruder to provide sufficient rate and pressure of a flow of melt through the melt filtration system. The melt pump also provides the capability to control and maintain an even flow of melt through the extruder system resulting in a uniform polymeric material.

In a typical process, the components of the composition, including a poly(phenylene ether), styrenic polymer, and flame retardant, are combined and subjected to the extrusion process according to techniques and instruments available to the skilled artisan. As the melt passes through the extruder, past the die head it is filtered using the filter package described herein.

In one embodiment of the process, the poly(phenylene ether) that is used to make the halogen-free melt-filtered polymer composition is poly(2,6-dimethyl-1,4-phenylene ether) having an intrinsic viscosity of approximately 0.29-0.49 dL/g as measured in chloroform at 25° C.

In one embodiment, the poly(phenylene ether) is poly(2,6-dimethyl-1,4-phenylene ether) having an intrinsic viscosity of approximately 0.29-0.49 dL/g as measured in chloroform at 25° C. In another embodiment, the poly(phenylene ether) is poly(2,6-dimethyl-1,4-phenylene ether) having an intrinsic viscosity of approximately 0.37-0.47 dL/g as measured in chloroform at 25° C. In another embodiment, the poly(phenylene ether) is poly(2,6-dimethyl-1,4-phenylene ether) having an intrinsic viscosity of approximately 0.375-0.425 dL/g as measured in chloroform at 25° C. In another embodiment, the poly(phenylene ether) is poly(2,6-dimethyl-1,4-phenylene ether) having an intrinsic viscosity of approximately 0.40 dL/g as measured in chloroform at 25° C. In another embodiment, the poly(phenylene ether) is poly(2,6-dimethyl-1,4-phenylene ether) having an average intrinsic viscosity of approximately 0.40 dL/g as measured in chloroform at 25° C. In another embodiment, the poly(phenylene ether) is poly(2,6-dimethyl-1,4-phenylene ether) having an intrinsic viscosity of approximately 0.46 dL/g as measured in chloroform at 25° C. In another embodiment, the poly(phenylene ether) is poly(2,6-dimethyl-1,4-phenylene ether) having an average intrinsic viscosity of approximately 0.46 dL/g as measured in chloroform at 25° C.

In one embodiment, the styrenic polymer is a general purpose polystyrene (GPPS), high impact polystyrene (HIPS), or a styrenic block copolymer.

In a further embodiment, the styrenic polymer is a GPPS.

In a further embodiment, the styrenic polymer is HIPS.

In another embodiment, the styrenic block copolymer is selected from a styrene-butadiene-styrene (SBS), a styrene-isoprene-styrene (SIS)), a styrene-ethylene/butylene-styrene (SEBS) and a styrene-ethylene/propylene-styrene block copolymer (SEPS).

In another embodiment, the styrenic block copolymer is selected from a styrene-ethylene/butylene-styrene (SEBS) and a styrene-ethylene/propylene-styrene block copolymer (SEPS).

In one embodiment, the flame retardant comprises resorcinol bis-diphenylphosphate (RDP), bis-phenol A bis-diphenylphosphate (BDADP), or mixtures thereof. In another embodiment, the flame retardant comprises RDP. In another embodiment, the flame retardant comprises BDADP.

In a further aspect, the invention is directed to a halogen-free melt-filtered polymer composition prepared by the process described herein, wherein the composition comprises:
(a) 70 to 80 percent by weight of poly(2,6-dimethyl-1,4-phenylene ether) an intrinsic viscosity of approximately 0.375 to 0.425 dL/g as measured in chloroform at 25° C.;
(b) 5 to 7 percent by weight of a styrene-ethylene/butylene-styrene copolymer;
(c) 7-9 percent by weight of RDP, BPADP, or mixtures thereof, wherein the weight percent of flame retardant is the same as or exceeds the weight percent of a styrenic polymer; and wherein the composition has:
  (i) a melt viscosity of 620 Pa·s or less as measured according at 280° C. and 1500 s$^{-1}$; and
  (ii) a heat deflection temperature that is 135° C. or more as measured according to ASTM D648 on 6.4 nun thick bars at 1.82 MPa.

In one embodiment, the composition prepared according to the process disclosed herein comprises:
(a) 70 to 90 percent by weight of poly(2,6-dimethyl-1,4-phenylene ether) having an intrinsic viscosity of approximately 0.39-0.47 dL/g as measured in chloroform at 25° C.:
(b) 3 to 9 percent by weight of a styrenic block copolymer;
(c) 7-9 percent by weight of a halogen-free flame retardant comprising at least one organic phosphate flame retardant, wherein the weight percent of flame retardant exceeds the weight percent of a styrenic polymer; and wherein the composition has:
  (i) a melt viscosity of 620 Pa·s or less as measured according at 280° C. and 1500 s$^{-1}$; and
  (ii) a heat deflection temperature that is 135° C. or more as measured according to ASTM D648 on 6.4 mm thick bars at 1.82 MPa.

In another embodiment, the composition prepared according to the process disclosed herein comprises:
(a) 80 to 90 percent by weight of poly(2,6-dimethyl-1,4-phenylene ether) an intrinsic viscosity of approximately 0.375 to 0.425 dL/g as measured in chloroform at 25° C.;
(b) 5 to 7 percent by weight of a styrene-ethylene/butylene-styrene copolymer;
(c) 7-9 percent by weight of RDP, wherein the composition has:
  (i) a melt viscosity of 620 Pa·s or less as measured according at 280° C. and 1500 s$^{-1}$; and
  (ii) a heat deflection temperature that is 135° C. or more as measured according to ASTM D648 on 6.4 mm thick bars at 1.82 MPa.

The process of claim 9, wherein the composition comprises:

In another embodiment, the composition prepared according to the process disclosed herein comprises:
(a) 80 to 90 percent by weight of poly(2,6-dimethyl-1,4-phenylene ether) an intrinsic viscosity of approximately 0.40 to 0.46 dL/g as measured in chloroform at 25° C.;
(b) 5 to 7 percent by weight of a styrene-ethylene/butylene-styrene copolymer;
(c) 7-9 percent by weight of a halogen-free flame retardant comprising RDP, wherein the weight percent of flame retardant exceeds the weight percent of a styrenic polymer; and wherein the composition has:
  (i) a melt viscosity of 620 Pa·s or less as measured according at 280° C. and 1500 s$^{-1}$; and
  (ii) a heat deflection temperature that is 135° C. or more as measured according to ASTM D648 on 6.4 mm thick bars at 1.82 MPa.

In another embodiment, the composition prepared according to the process disclosed herein comprises:
(a) 70 to 80 percent by weight of poly(2,6-dimethyl-1,4-phenylene ether) an intrinsic viscosity of approximately 0.375 to 0.425 dL/g as measured in chloroform at 25° C.;
(b) 5 to 7 percent by weight of a styrene-ethylene/butylene-styrene copolymer;

(c) 7-9 percent by weight of RDP, BPADP, or mixtures thereof, wherein the weight percent of flame retardant is the same as or exceeds the weight percent of a styrenic polymer; and wherein the composition has:
   (i) a melt viscosity of 620 Pa·s or less as measured according at 280° C. and 1500 s$^{-1}$; and
   (ii) a heat deflection temperature that is 135° C. or more as measured according to ASTM D648 on 6.4 min thick bars at 1.82 MPa.

In another embodiment, the composition prepared according to the process disclosed herein comprises:
  (a) 60 to 90 percent by weight of a poly(phenylene ether);
  (b) 3 to 23 percent by weight of a polystyrene;
  (c) 5-11 percent by weight of a halogen-free flame retardant comprising at least one organic phosphate flame retardant, wherein the composition has:
   (i) a melt viscosity of 620 Pa·s or less as measured according at 280° C. and 1500 s$^{-1}$; and
   (ii) a heat deflection temperature that is 135° C. or more as measured according to ASTM D648 on 6.4 mm thick bars at 1.82 MPa;
wherein the process comprises melting the composition and then filtering the composition through a filter.

In another embodiment, the composition prepared according to the process disclosed herein comprises:
  (a) 70 to 80 percent by weight of poly(2,6-dimethyl-1,4-phenylene ether) an intrinsic viscosity of approximately 0.375 to 0.425 dL/g as measured in chloroform at 25° C.;
  (b) 5 to 7 percent by weight of a styrene-ethylene/butylene-styrene copolymer;
  (c) 7-9 percent by weight of RDP, BPADP, or mixtures thereof, wherein the weight percent of flame retardant is the same as or exceeds the weight percent of a styrenic polymer; and wherein the composition has:
   (i) a melt viscosity of 620 Pa·s or less as measured according at 280° C. and 1500 s$^{-1}$; and
   (ii) a heat deflection temperature that is 135° C. or more as measured according to ASTM D648 on 6.4 mm thick bars at 1.82 MPa.
wherein the process further comprises compounding the ingredients on an extruder equipped with a filter, wherein the filter is attached between the last barrel and the die In the process embodiments provided herein, specks 0.5 mm$^2$ or greater in size are removed from the material, so that no specks are visible to the naked eye when the material is drawn out into a film. Moreover, the process is suited to industrial scale material manufacture. Run processing times for making the material are as long 10 hours. Run processing times as long as 10 hours are indicative of a process where performance failures, including filter plugging, high back pressures, and the like, are minimized. Throughput in making the material is at least 20 kg/hr and can exceed 260 kg/hr.

Film for Photovoltaic Backsheet

The particulate-free compositions that are made according to the process described herein are suitable for various uses. Thus, in another aspect, the invention is directed to an article prepared from the composition described herein.

In one embodiment, the article is a halogen-free polymeric film for use as a photovoltaic cell backsheet.

In one embodiment, the polymeric film, comprises:
  (a) 60 to 90 percent by weight of a poly(phenylene ether);
  (b) 3 to 23 percent by weight of a styrenic polymer;
  (c) 5-11 percent by weight of a halogen-free flame retardant comprising at least one organic phosphate flame retardant, wherein the film is free of surface grits and pits that are 0.5 mm$^2$ in size or larger.

In one embodiment, the poly(phenylene ether) is poly(2,6-dimethyl-1,4-phenylene ether) having an intrinsic viscosity of approximately 0.37-0.47 dL/g as measured in chloroform at 25° C.

In one embodiment, wherein styrenic polymer is a general purpose polystyrene (GPPS), high impact polystyrene (HIPS), or a styrenic block copolymer.

In a further embodiment, the styrenic polymer is a GPPS.

In a further embodiment, the styrenic polymer is a HIPS.

In another embodiment, the styrenic block copolymer is selected from a styrene-butadiene-styrene (SBS), a styrene-isoprene-styrene (SIS)), a styrene-ethylene/butylene-styrene (SEBS) and a styrene-ethylene/propylene-styrene block copolymer (SEPS).

In another embodiment, the styrenic block copolymer is selected from a styrene-ethylene/butylene-styrene (SEBS) and a styrene-ethylene/propylene-styrene block copolymer (SEPS).

In another embodiment, the flame retardant comprises resorcinol bis-diphenylphosphate (RDP), bis-phenol A bis-diphenylphosphate (BDADP), or mixtures thereof.

In a further embodiment, the flame retardant comprises resorcinol bis-diphenylphosphate (RDP).

In another embodiment, the film comprises:
  (a) 70 to 90 percent by weight of poly(2,6-dimethyl-1,4-phenylene ether) having an intrinsic viscosity of approximately 0.37-0.47 dL/g as measured in chloroform at 25° C.;
  (b) 5 to 7 percent by weight of a styrenic block copolymer;
  (c) 7-9 percent by weight of a halogen-free flame retardant comprising at least one organic phosphate flame retardant.

In another embodiment, the film comprises:
  (a) 80 to 90 percent by weight of poly(2,6-dimethyl-1,4-phenylene ether) an intrinsic viscosity of approximately 0.37 to 0.47 dL/g as measured in chloroform at 25° C.;
  (b) 5 to 7 percent by weight of a styrene-ethylene/butylene-styrene copolymer;
  (c) 7-9 percent by weight of RDP, BPADP, or mixtures thereof.

In another aspect, the invention comprises a halogen-free polymeric film, comprising:
  (a) 80 to 90 percent by weight of poly(2,6-dimethyl-1,4-phenylene ether) an intrinsic viscosity of approximately 0.37 to 0.47 dL/g as measured in chloroform at 25° C.;
  (b) 5 to 7 percent by weight of a styrene-ethylene/butylene-styrene copolymer;
  (c) 7-9 percent by weight of a halogen-free flame retardant comprising RDP, BPADP, or mixtures thereof wherein the weight percent of flame retardant is the same as or exceeds the weight percent of a styrenic polymer; and wherein the film is free of surface grits and pits that are 0.5 mm$^2$ in size or larger.

Typically, the film is prepared using a single screw extruder (L/D=32; diameter=65 mm) equipped with a T-Die (width 1500 mm). The temperature of the extruder barrel and T-Die is set at 330-275° C. and 310° C., respectively. The throughput is typically 85 kg/h. The films are then laminated, typically at 150° C., 0.02 kg/cm$^2$ for 30 min.

In another aspect, the invention is directed a film that is free of surface grits and pits that are 0.5 mm$^2$ in size or larger, comprising:
  (a) 60 to 90 percent by weight of a poly(phenylene ether);
  (b) 3 to 23 percent by weight of a styrenic polymer;

(c) 5-11 percent by weight of a halogen-free flame retardant comprising at least one organic phosphate flame retardant.

In one embodiment, the film comprises:
(a) 80 to 90 percent by weight of poly(2,6-dimethyl-1,4-phenylene ether) an intrinsic viscosity of approximately 0.375 to 0.425 dL/g as measured in chloroform at 25° C.;
(b) 5 to 7 percent by weight of a styrene-ethylene/butylene-styrene copolymer;
(c) 7-9 percent by weight of RDP, BPADP, or mixtures thereof, wherein the weight percent of flame retardant is the same as or exceeds the weight percent of a styrenic polymer.

The following examples illustrate the scope of the invention. The examples and preparations which follow are provided to enable those skilled in the art to more clearly understand and to practice the present invention. They should not be considered as limiting the scope of the invention, but merely as being illustrative and representative thereof.

EXAMPLES

The examples of the compositions of the present invention, annotated hereinafter as "EX," and their comparative examples, annotated hereinafter as "CE", employed the materials listed in Table 1. All weight percents employed in the examples are based on the weight percent of the entire composition except where stated otherwise.

TABLE 1

| Component | Trade name and Supplier |
|---|---|
| PPE | Poly(2,6-dimethyl-1,4-phenylene ether), CAS Reg. No. 25134-01-4, having an intrinsic viscosity of 0.46 deciliters per gram, measured in chloroform at 25° C., and obtained as PPO 646 resin from SABIC Plastics ("0.46 IV PPE"). |
| PPO640 | Poly(2,6-dimethyl-1,4-phenylene ether), CAS Reg. No. 25134-01-4, having an intrinsic viscosity of 0.4 deciliters per gram, measured in chloroform at 25° C., and obtained as PPO 640 resin from SABIC Plastics. ("0.4 IV PPE"). |
| GPPS | General Purpose Polystyrene available as Dicstyrene CR-3500 from DIC Corporation. |
| HIPS | High Impact Polystyrene available as HT640 from Idemitsu SM Sdh. Bhd. |
| SEBS | A polystyrene-poly(ethylene-butylene)-polystyrene tri-block copolymer having a polystyrene content of about 31 to 35 weight percent and a weight average molecular weight of about 240,000 to 300,000 atomic mass units; obtained as Kraton G1651 from Kraton Polymers. |
| RDP | Resorcinol bis(diphenyl phosphate), CAS Reg. No. 57583-54-7, obtained as from DaihachiChemical Industry CO., Ltd, under the tradename CR733S. |
| BDADP | Bisphenol A bis-diphenylphosphate, CAS Reg. No. 181028-79-5, commercially available from DAIHACHI Chemical Industry Co., Ltd. under the tradename of CR741. |
| Other Additives | Mold release agents, acid scavengers, thermal stabilizers, and flow promoters |

Method

The compositions, comparative examples, and ASTM testing specimens were prepared as provided below.

Non-Filter Extrusion

Compositions were compounded on a Toshiba TEM50A twin-screw extruder having a 94 mm internal diameter and operating at a screw rotation rate of 170 rpm and a throughput of about 260 kg/h. The extruder utilized 11 zones having temperatures of 200° C./200° C./200° C./250° C./250° C./250° C./250° C./200° C./200° C./200° C./220° C./Die 320° C. from feed throat to die. The resin temperature is measured from the resin as it comes out of die hole.

Filter Extrusion

Compositions were compounded on a Toshiba TEM50A twin-screw extruder having a 94 mm internal diameter and operating at a screw rotation rate of 170 rpm and a throughput of about 260 kg/h. The extruder utilized 11 zones having temperatures of 200° C./200° C./200° C./250° C./250° C./250° C./250° C./200° C./200° C./200° C./220° C./Die 320° C. from feed throat to die. The filter package was attached between the last barrel and die. The set of filters was 420 mesh/4200 mesh/#20 mesh package. The resin temperature was measured from the resin as it comes out of die hole. The filter was made by Taiyo wire cloth Co. Ltd.

Film Fabrication

Films were fabricated with extruder (L/D=32) equipped with single screw (D=65 mm) and T-Die (width: 1500 mm). The temperature of barrel and T-die in the extruder was set at 275-330° C. and 310° C., respectively. The throughput is 85 kg/h.

Film Lamination

Lamination was carried out at 150° C., 0.02 kg/cm$^2$ for 30 min.

Heat Aging Test

The heat aging test was carried out on samples at 150° C. for 30 minutes. Samples were visually checked for shape deformation.

Molding for ASTM Testing Specimens

Physical testing samples were injection molded on a Toyo Machinary & metal Co. Ltd. Toyo Paster Ti-SOG injection molding machine using a barrel temperature of 280° C. and a mold temperature of 60° C.

Testing

The ASTM and/or UL tests used to characterize the compositions of the present invention, and the comparative examples, are summarized below in Table 2.

TABLE 2

| Test | Description |
|---|---|
| NII | Notched Izod Impact strength (NII) and percent ductility were determined on one-eighth inch (3.12 mm) bars per ASTM D256 at temperatures of 23° C., and is reported in units of Joules per meter. |
| HDT | Heat Deflection Temperature (HDT) were determined according to ASTM D648 on 6.4 mm thick bars at 1.82 MPa. |
| MFI | Melt flow index (MFI) was run on dried pellets as per ASTM D1238 at 300° C. using a 5 kg weight. All molded samples were conditioned for at least 48 h at 50% relative humidity prior to testing. |
| MV | The Melt Viscosity (MV) was measured by multipoint capillary rheometry on a Kayeness Rheometer at 1500° C. using a 4 minute dwell time. Values for the shear rate are in reciprocal seconds and for MV are in Pascal-seconds. |

Results

Table 3 summarizes the testing results for Comparative Examples and Examples of compositions of the present invention. In the Table, an "x" means that the example did not perform favorably/withstand the relevant test or operation. A "○" means that the sample performed favorably in the relevant test or operation. A "Δ" means that the sample exhibited marginal change when subjected to the test or operation, but the overall performance was acceptable.

TABLE 3

| Description | CEX1-1 | EX1-2 | CEX2-1 | CEX2-2 | CEX2-3 | CEX3 | CEX4 | CEX5-1 | EX5-2 |
|---|---|---|---|---|---|---|---|---|---|
| Composition | | | | | | | | | |
| PPO IV 0.46 | | | 84.2 | 84.2 | 84.2 | 64.4 | 70 | 70 | 70 |
| PPO IV 0.40 | 84.2 | 84.2 | | | | | | | |
| GPPS | | | | | | | 7.5 | | |
| regular HIPS | | | | | | 22.6 | | 15 | 15 |
| SEBS | 5.55 | 5.55 | 5.55 | 5.55 | 5.55 | | 5.7 | 5.1 | 5.1 |
| RDP | 7.85 | 7.85 | 7.85 | 7.85 | 7.85 | | | | |
| BPA-DP | | | | | | 11.3 | 14.9 | 7.6 | 7.6 |
| Other Components: LLDPE, ZnS, MgO, Pentaerythritol tetrakis (beta lauryl thiopropionate) | 2.4 | 2.4 | 2.4 | 2.4 | 2.4 | 1.7 | 1.9 | 2.3 | 2.3 |
| Total | 100 | 100 | 100 | 100 | 100 | 100 | 100 | 100 | 100 |
| Process | | | | | | | | | |
| Barrel Temperature ° C. | 200-250 | 200-250 | 200-250 | 200-250 | 200-250 | 230-280 | 230-290 | 200-250 | 200-250 |
| Resin Temperature ° C. | 340 | 340 | 347 | 349 | 350 | 348 | 348 | 345 | 348 |
| Filter (mesh size) | N/A | 200 | N/A | 100 | 200 | N/A | N/A | N/A | 200 |
| Properties | | | | | | | | | |
| NII (J/m) | 223 | 225 | 190 | 60 | 60 | 166 | 220 | 300 | 300 |
| HDT (° C.) | 139 | 140 | 145 | 146 | 147 | 125 | 126 | 135 | 135 |
| MFI (g/10 min) | 12 | 12 | 11 | 10 | 10 | 15 | 23 | 14 | 16 |
| MV (Pa * s) | 565 | 613 | 623 | 645 | 775 | 327 | 386 | 412 | 457 |
| Film Fabrication | | | | | | | | | |
| Surface Quality | x | o | x | x | x | o | o | | o |
| Long-run Process Time (h) | x (2) | o (>10) | x (1) | x (1) | x (5) | o (>10) | o (>10) | | o (>10) |
| Lamination Process | o | o | o | o | o | x | x | | |
| Heat aging test | | o | | | | | x | | Δ |

As provided in Table 3, Example 1-2 was melt filtered with a 200 mesh filter during processing. Example 1-2 had comparable impact strength to Comparative Example 1-1 as measured by the ASTM 256 Notched Izod Impact test. Example 1-2 had a melt viscosity of 640 Pa·s and a Melt Flow Index of 12 g/10 min. Like Comparative Example 1-1, Example 1-2 also exhibited an HDT of greater than 135° C. An HDT of 135° C. or greater correlates with the ability of a film made from the composition to withstand the lamination process. Unlike Comparative Example 1-1, the film prepared using the composition of Example 1-2 was free of visible surface grits and pits (>0.5 mm² in size) and thus exhibited good surface quality, withstood lamination processing conditions, and provided long-run processing times. Run processing time is defined as the time recorded until the extrusion is discontinued due to performance failures, including the filter plugging, high back pressures, and the like. The target run processing time is 10 or more hours.

Comparative Example 2-1 which employed higher molecular weight polyphenylene ether and was not filtered, had lower impact strength than Example 1-2 as well as diminished surface quality. Comparative Examples 2-2 and 2-3, also both employing lower molecular weight polyphenylene ether, were melt filtered through a 100 or 200 mesh filter, respectively, had higher melt viscosities, and gave substantially lower impact strength than Comparative Example 2-1. In addition, the corresponding films exhibited poorer surface quality as compared to Example 1-1. Finally, Comparative Examples 2-1, 2-2, and 2-3 did not withstand long processing conditions.

Comparative Examples 3 and 4 had lower melt viscosities than Example 1-2, lower HDT values, and did not withstand the lamination process.

Comparative Example 5-1 and Example 5-2 probe the limit of lamination processability in terms of HDT and for compositions with higher styrenic content. Example 5-1 had comparable impact strength to Comparative Example 5-2 and a similar HDT of 135° C. In addition, the film prepared using the composition of Example 5-2 was free of visible surface grits and pits (>0.5 mm² in size) and thus exhibited good surface quality whereas Comparative Example 5-1 did not. Comparative Example 5-1 and Example 5-2 both withstood lamination processing conditions, but only Example 5-2 provided long-run processing times performed acceptably in the heat aging test.

The foregoing invention has been described in some detail by way or illustration and example for purposes of clarity and understanding. The invention has been described with reference to various specific embodiments and techniques. It should be understood that many variations and modifications may be made while remaining within the spirit and scope of the invention. It will be obvious to one of skill in the art that changes and modifications may be practiced within the scope of the appended claims. The above description is intended to be illustrative and not restrictive. The scope of the invention should, therefore, be determined not with reference to the above description, but should instead be determined with reference to the following appended claims, along with the full scope of equivalents to which such claims are entitled. If a term in the present application contradicts or conflicts with a term in the incorporated reference, the term from the present application takes precedence over the conflicting term from the incorporated reference.

The invention claimed is:

1. A process for preparing a halogen-free melt-filtered polymer composition, comprising: filtering the melted composition through a filter to remove particulate impurities that are visible to the naked eye from a film fabricated with the composition which is produced in the process, wherein the throughput for making the composition is at least 20 kg/hr and wherein the composition comprises:
  (a) 60 to 90 percent by weight of a poly(phenylene ether);
  (b) 3 to 23 percent by weight of a styrenic polymer;
  (c) 5-11 percent by weight of a halogen-free flame retardant comprising at least one organic phosphate flame retardant, wherein the composition has:
    (i) a melt viscosity of 620 Pa·s or less as measured according at 280° C. and 1500 s$^{-1}$; and
    (ii) a heat deflection temperature that is 135° C. or more as measured according to ASTM D648 on 6.4 mm thick bars at 1.82 MPa.

2. The process of claim 1, wherein the composition is prepared using an extruder having a terminal barrel and a die head.

3. The process of claim 2, wherein the filter is positioned after the terminal barrel of the extruder.

4. The process of claim 3, wherein the filter is positioned after the die head of the extruder.

5. The process of claim 4, wherein the filtering occurs at a temperature of 260° C. to 380° C.

6. The process of claim 5, wherein the filter is selected from the group consisting of a sieve, a sintered-metal filter, metal a mesh or screen filter, a fiber metal felt filter, and ceramic filters, and a combination of thereof.

7. The process of claim 6, wherein the filter comprises a 200 mesh filter sandwiched between two 20 mesh filters.

8. The process of claim 7, wherein the poly(phenylene ether) is poly(2,6-dimethyl-1,4-phenylene ether) having an intrinsic viscosity of approximately 0.375-29-0.49 dL/g as measured in chloroform at 25° C.

9. The process of claim 7, wherein the styrenic polymer is a general purpose polystyrene, high impact polystyrene, or a styrenic block copolymer.

10. The process of claim 9, wherein the styrenic block copolymer is selected from the group consisting of a styrene-butadiene-styrene (SBS), a styrene-isoprene-styrene (SIS)), a styrene-ethylene/butylene-styrene (SEBS) and a styrene-ethylene/propylene-styrene block copolymer (SEPS).

11. The process of claim 10, wherein the styrenic block copolymer is selected from the group consisting of a styrene-ethylene/butylene-styrene (SEBS) and a styrene-ethylene/propylene-styrene block copolymer (SEPS).

12. The process of claim 7, wherein the flame retardant comprises resorcinol bis-diphenylphosphate (RDP), bis-phenol A bis-diphenylphosphate (BDADP), or mixtures thereof.

13. The process of claim 12, wherein the flame retardant comprises bis-phenol A bis-diphenylphosphate (BDADP).

14. The process of claim 7, wherein the composition comprises:
  (a) 70 to 90 percent by weight of poly(2,6-dimethyl-1,4-phenylene ether) having an intrinsic viscosity of approximately 0.37-0.47 dL/g as measured in chloroform at 25° C.;
  (b) 3 to 9 percent by weight of a styrenic block copolymer;
  (c) 7 to 9 percent by weight of a halogen-free flame retardant comprising at least one organic phosphate flame retardant, wherein the weight percent of flame retardant exceeds the weight percent of a styrenic polymer; and wherein the composition has:
    (i) a melt viscosity of 620 Pa·s or less as measured according at 280° C. and 1500 s$^{-1}$; and
    (ii) a heat deflection temperature that is 135° C. or more as measured according to ASTM D648 on 6.4 mm thick bars at 1.82 MPa.

15. The process of claim 7, wherein the composition comprises:
  (a) 80 to 90 percent by weight of poly(2,6-dimethyl-1,4-phenylene ether) an intrinsic viscosity of approximately 0.375 to 0.425 dL/g as measured in chloroform at 25° C.;
  (b) 5 to 7 percent by weight of a styrene-ethylene/butylene-styrene copolymer;
  (c) 7 to 9 percent by weight of RDP, BPADP, or mixtures thereof, wherein the composition has:
    (i) a melt viscosity of 620 Pa·s or less as measured according at 280° C. and 1500 s$^{-1}$; and
    (ii) a heat deflection temperature that is 135° C. or more as measured according to ASTM D648 on 6.4 mm thick bars at 1.82 MPa.

16. The process of claim 1, wherein the halogen-free melt-filtered polymer composition comprises:
  (a) 60 to 90 percent by weight of a poly(phenylene ether);
  (b) 3 to 23 percent by weight of a styrenic polymer;
  (c) 5 to 11 percent by weight of a halogen-free flame retardant comprising at least one organic phosphate flame retardant, wherein the composition has:
    (i) a melt viscosity of 620 Pa·s or less as measured according at 280° C. and 1500 s$^{-1}$; and
    (ii) a heat deflection temperature that is 135° C. or more as measured according to ASTM D648 on 6.4 mm thick bars at 1.82 MPa;
wherein the process comprises melting the composition and then filtering the composition through a filter.

17. The process of claim 16, wherein the composition comprises
  (a) 60 to 90 percent by weight of poly(2,6-dimethyl-1,4-phenylene ether) an intrinsic viscosity of approximately 0.375 to 0.425 dL/g as measured in chloroform at 25° C.;
  (b) 5 to 7 percent by weight of a styrene-ethylene/butylene-styrene copolymer;
  (c) 7-9 percent by weight of RDP, BPADP, or mixtures thereof, wherein the weight percent of flame retardant is the same as or exceeds the weight percent of a styrenic polymer; and wherein the composition has:
    (i) a melt viscosity of 620 Pa·s or less as measured according at 280° C. and 1500 s$^{-1}$; and
    (ii) a heat deflection temperature that is 135° C. or more as measured according to ASTM D648 on 6.4 mm thick bars at 1.82 MPa.
wherein the process further comprises compounding the ingredients on an extruder equipped with a filter, wherein the filter is attached between the last barrel and the die.

18. A halogen-free melt-filtered polymer composition prepared by the process of claim 1, comprising:
  (a) 60 to 90 percent by weight of a poly(phenylene ether);
  (b) 3 to 23 percent by weight of a styrenic polymer;
  (c) 5-11 percent by weight of a halogen-free flame retardant comprising at least one organic phosphate flame retardant.

19. The composition of claim 18, wherein the composition comprises:
  (a) 80 to 90 percent by weight of poly(2,6-dimethyl-1,4-phenylene ether) an intrinsic viscosity of approximately 0.375 to 0.425 dL/g as measured in chloroform at 25° C.;
  (b) 5 to 7 percent by weight of a styrene-ethylene/butylene-styrene copolymer;
  (c) 7-9 percent by weight of RDP, BPADP, or mixtures thereof, wherein the weight percent of flame retardant is the same as or exceeds the weight percent of a styrenic polymer.

20. The composition of claim 18 which is a film, wherein the film is free of surface grits and pits that are visible to the naked eye.

21. A halogen-free melt-filtered polymer composition prepared according to claim 1, which is a film that is free of surface grits and pits that are visible to the naked eye, comprising:
  (a) 60 to 90 percent by weight of a poly(phenylene ether);
  (b) 3 to 23 percent by weight of a styrenic polymer;
  (c) 5-11 percent by weight of a halogen-free flame retardant comprising at least one organic phosphate flame retardant.

22. The film of claim 21, comprising:
  (a) 80 to 90 percent by weight of poly(2,6-dimethyl-1,4-phenylene ether) an intrinsic viscosity of approximately 0.375 to 0.425 dL/g as measured in chloroform at 25° C.;
  (b) 5 to 7 percent by weight of a styrene-ethylene/butylene-styrene copolymer;
  (c) 7-9 percent by weight of a halogen-free flame retardant which is RDP, BPADP, or mixtures thereof, wherein the weight percent of flame retardant is the same as or exceeds the weight percent of the styrenic polymer which is a styrene-ethylene/butylene-styrene copolymer.

* * * * *